United States Patent
Kito et al.

(10) Patent No.: US 11,279,354 B2
(45) Date of Patent: Mar. 22, 2022

(54) TRAVEL CONTROL APPARATUS OF SELF-DRIVING VEHICLE

(71) Applicant: Honda Motor Co., Ltd., Tokyo (JP)

(72) Inventors: Akira Kito, Wako (JP); Yoshiaki Konishi, Wako (JP); Takayuki Kishi, Wako (JP); Toshiyuki Mizuno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 371 days.

(21) Appl. No.: 16/216,942

(22) Filed: Dec. 11, 2018

(65) Prior Publication Data

US 2019/0202457 A1 Jul. 4, 2019

(30) Foreign Application Priority Data

Dec. 28, 2017 (JP) .............................. JP2017-254333

(51) Int. Cl.
*B60W 30/16* (2020.01)
*B60W 30/18* (2012.01)

(52) U.S. Cl.
CPC .... *B60W 30/162* (2013.01); *B60W 30/18163* (2013.01); *B60W 2554/801* (2020.02)

(58) Field of Classification Search
CPC ......... B60W 30/162; B60W 30/18163; B60W 2554/801; B60W 30/14; B60W 30/16; B60W 40/00
See application file for complete search history.

(56) References Cited

U.S. PATENT DOCUMENTS

2016/0272204 A1* 9/2016 Takahashi ............. B60W 30/16

FOREIGN PATENT DOCUMENTS

| CN | 105984342 A | 10/2016 |
|----|-------------|---------|
| JP | 2016004443 A | 1/2016 |
| JP | 2016009201 A | 1/2016 |

OTHER PUBLICATIONS

Chinese Office action; Application 201811520780.7; dated Aug. 24, 2021.

* cited by examiner

Primary Examiner — Jess Whittington
Assistant Examiner — Brian E Yang
(74) Attorney, Agent, or Firm — Duft & Bornsen, PC (57) ABSTRACT

A travel control apparatus of a self-driving vehicle including an electric control unit having a microprocessor and a memory, wherein the microprocessor is configured to function as: a proximity degree calculation unit configured to calculate a degree of proximity of a rearward vehicle at a rear of the self-driving vehicle to the self-driving vehicle; a proximity degree determination unit configured to determine whether the degree of proximity calculated by the proximity degree calculation unit is equal to or greater than a predetermined degree; and an actuator control unit configured to control the actuator so as to increase a maximum vehicle speed when it is determined by the proximity degree determination unit that the degree of proximity is equal to or greater than the predetermined degree than when it is determined that the degree of proximity is less than the predetermined degree.

4 Claims, 9 Drawing Sheets

TRAVEL CONTROL APPARATUS OF SELF-DRIVING VEHICLE

CROSS-REFERENCE TO RELATED APPLICATION

This application is based upon and claims the benefit of priority from Japanese Patent Application No. 2017-254333 filed on Dec. 28, 2017, the content of which is incorporated herein by reference.

BACKGROUND OF THE INVENTION

Field of the Invention

This invention relates to a travel control apparatus of a self-driving vehicle for controlling a travel operation when there is a vehicle behind the self-driving vehicle having a self-driving capability.

Description of the Related Art

Conventionally, apparatuses are known that in the course of a vehicle (subject vehicle) performing overtake of a vehicle ahead (preceding vehicle) during self-driving detects traveling state of a vehicle behind and automatically returns the subject vehicle to original lane when overtaking is itself unadvisable or when returning to original lane is preferable to overtaking the vehicle ahead. An apparatus of this type is described in Japanese Unexamined Patent Publication No. 2016-004443 (JP2016-004443A), for example.

However, JP2016-004443A is completely silent regarding preferable traveling activity when, as sometimes happens, surrounding circumstances make it difficult for the subject vehicle to perform a maneuver such as lane change in order to yield its traffic lane to a vehicle closely approaching from behind.

SUMMARY OF THE INVENTION

An aspect of the present invention is a travel control apparatus of a self-driving vehicle, configured to control an actuator used for driving the self-driving vehicle having a self-driving capability. The travel control apparatus comprising an electric control unit having a microprocessor and a memory. The microprocessor is configured to perform: calculating a degree of proximity of a rearward vehicle at a rear of the self-driving vehicle to the self-driving vehicle; determining whether the degree of proximity calculated in the calculating is equal to or greater than a predetermined degree; and controlling the actuator so as to increase a maximum vehicle speed when it is determined that the degree of proximity is equal to or greater than the predetermined degree than when it is determined that the degree of proximity is less than the predetermined degree.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
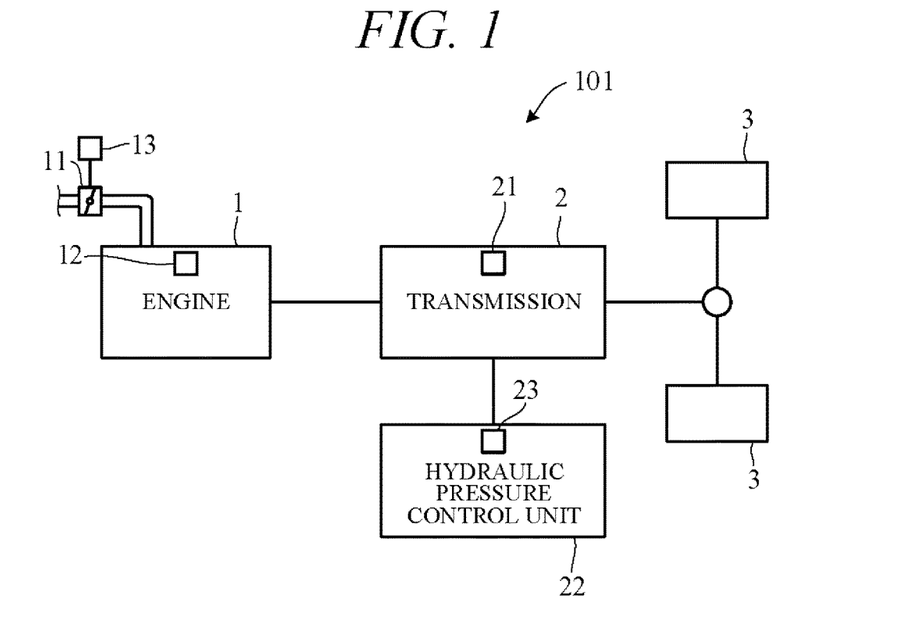
FIG. 1 is a diagram showing a configuration overview of a driving system of a self-driving vehicle to which a travel control apparatus according to an embodiment of the present invention is applied.

Hereinafter, an embodiment of the present invention is explained with reference to FIGS. 1 to 11. A travel control apparatus according to an embodiment of the present invention is applied to a vehicle (self-driving vehicle) having a self-driving capability. FIG. 1 is a diagram showing a configuration overview of a driving system of a self-driving vehicle 101 incorporating a travel control apparatus according to the present embodiment. Herein, the self-driving vehicle may be sometimes called subject vehicle to differentiate it from other vehicles. The vehicle 101 is not limited to driving in a self-drive mode requiring no driver driving operations but is also capable of driving in a manual drive mode by driver operations.

As shown in FIG. 1, the vehicle 101 includes an engine 1 and a transmission 2. The engine 1 is an internal combustion engine (e.g., gasoline engine) wherein intake air supplied through a throttle valve and fuel injected from an injector are mixed at an appropriate ratio and thereafter ignited by a sparkplug or the like to burn explosively and thereby generate rotational power. A diesel engine or any of various other types of engine can be used instead of a gasoline engine. Air intake volume is metered by the throttle valve. An opening angle of the throttle valve 11 (throttle opening angle) is changed by a throttle actuator 13 operated by an electric signal. The opening angle of the throttle valve 11 and an amount of fuel injected from the injector 12 (injection timing and injection time) are controlled by a controller 40 (FIG. 2).

The transmission 2, which is installed in a power transmission path between the engine 1 and drive wheels 3, varies speed ratio of rotation of from the engine 1, and converts and outputs torque from the engine 1. The rotation of speed converted by the transmission 2 is transmitted to the drive wheels 3, thereby propelling the vehicle 101. Optionally, the vehicle 101 can be configured as an electric vehicle or hybrid vehicle by providing a drive motor as a drive power source in place of or in addition to the engine 1.

The transmission 2 is, for example, a stepped transmission enabling stepwise speed ratio (gear ratio) shifting in accordance with multiple (e.g. six) speed stages. Optionally, a continuously variable transmission enabling stepless speed ratio shifting or a reduction gear with no shift change mechanism can be used as the transmission 2. Although omitted in the drawings, power from the engine 1 can be input to the transmission 2 through a torque converter. The transmission 2 can, for example, incorporate a dog clutch, friction clutch or other engaging element 21. A hydraulic pressure control unit 22 can shift speed stage of the transmission 2 by controlling flow of oil to the engaging element 21. The hydraulic pressure control unit 22 includes a solenoid valve or other valve mechanism operated by electric signals (called "shift actuator 23" for sake of convenience), and an appropriate speed stage can be implemented by changing flow of hydraulic pressure to the engaging element 21 in response to operation of the shift actuator 23.

Figure 2:
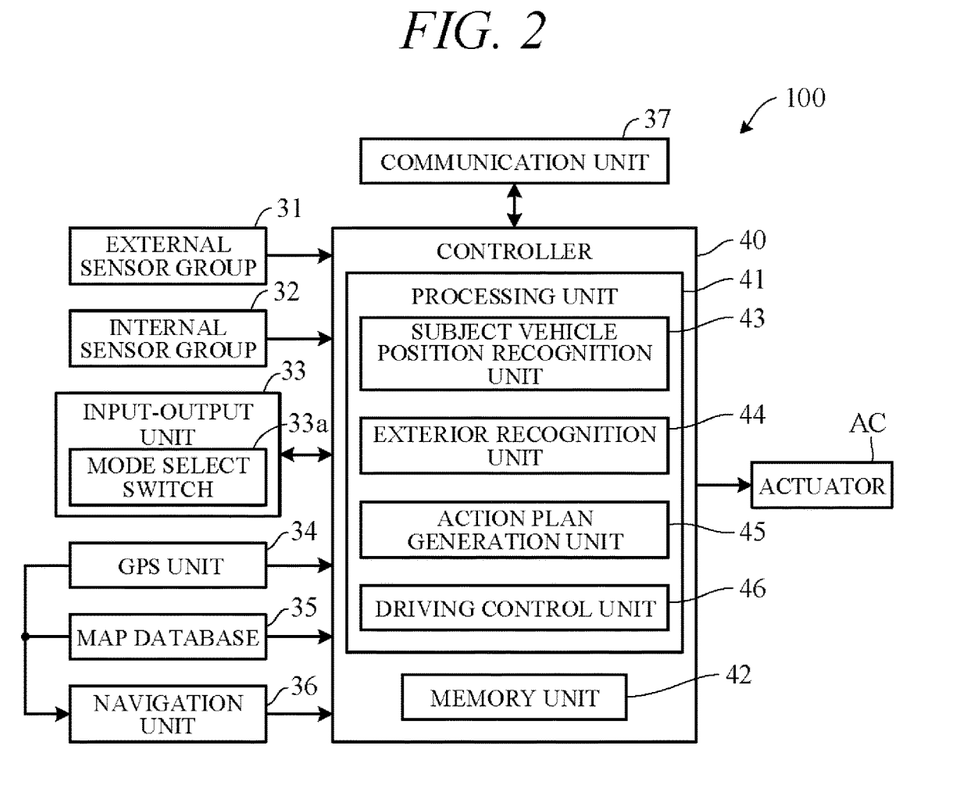
FIG. 2 is a block diagram schematically illustrating overall configuration of a vehicle control system including a travel control apparatus according to an embodiment of the present invention.

FIG. 2 is a block diagram schematically illustrating overall configuration of a vehicle control system 100 of the self-driving vehicle 101 to which a travel control apparatus according to an embodiment of the present invention is applied. As shown in FIG. 2, the vehicle control system 100 includes mainly of the controller 40, and as members communicably connected with the controller 40 through CAN (Controller Area Network) communication or the like, an external sensor group 31, an internal sensor group 32, an input-output unit 33, a GPS unit 34, a map database 35, a navigation unit 36, a communication unit 37, and actuators AC.

The term external sensor group 31 herein is a collective designation encompassing multiple sensors (external sensors) for detecting external circumstances constituting subject vehicle ambience data. For example, the external sensor group 31 includes, inter alia, a LIDAR (Light Detection and Ranging) for measuring distance from the vehicle to ambient obstacles by measuring scattered light produced by laser light radiated from the subject vehicle in every direction, a RADAR (Radio Detection and Ranging) for detecting other vehicles and obstacles around the subject vehicle by radiating electromagnetic waves and detecting reflected waves, and a CCD, CMOS or other image sensor-equipped on-board cameras for imaging subject vehicle ambience (forward, reward and sideways).

The term internal sensor group 32 herein is a collective designation encompassing multiple sensors (internal sensors) for detecting subject vehicle driving state. For example, the internal sensor group 32 includes, inter alia, an engine speed sensor for detecting engine rotational speed, a vehicle speed sensor for detecting subject vehicle running speed, acceleration sensors for detecting subject vehicle forward-rearward direction acceleration and lateral acceleration, respectively, a yaw rate sensor for detecting rotation angle speed around a vertical axis through subject vehicle center of gravity, and a throttle opening sensor for detecting throttle opening angle. The internal sensor group 32 also includes sensors for detecting driver driving operations in manual drive mode, including, for example, accelerator pedal operations, brake pedal operations, steering wheel operations and the like.

The term input-output unit 33 is used herein as a collective designation encompassing apparatuses receiving instructions input by the driver and outputting information to the driver. For example, the input-output unit 33 includes, inter alia, switches which the driver uses to input various instructions, a microphone which the driver uses to input voice instructions, a display for presenting information to the driver via displayed images, and a speaker for presenting information to the driver by voice. In FIG. 2, a mode select switch 33a for instructing either self-drive mode or manual drive mode is shown as an example of various switches constituting the input-output unit 33.

The mode select switch 33a, for example, is configured as a switch manually operable by the driver to output instructions of switching to the self-drive mode enabling self-drive functions when the switch is operated to ON and the manual drive mode disabling self-drive functions when the switch is operated to OFF. Optionally, the mode select switch can be configured to instruct switching from manual drive mode to self-drive mode or from self-drive mode to manual drive mode when a predetermined condition is satisfied without operating the mode select switch. In other words, mode select can be performed automatically not manually in response to automatic switching of the mode select switch.

The GPS unit 34 includes a GPS receiver for receiving position determination signals from multiple GPS satellites, and measures absolute position (latitude, longitude and the like) of the subject vehicle based on the signals received from the GPS receiver.

The map database 35 is a unit storing general map data used by the navigation unit 36 and is, for example, implemented using a hard disk. The map data include road position data and road shape (curvature etc.) data, along with intersection and road branch position data. The map data stored in the map database 35 are different from high-accuracy map data stored in a memory unit 42 of the controller 40.

The navigation unit 36 retrieves target road routes to destinations input by the driver and performs guidance along selected target routes. Destination input and target route guidance is performed through the input-output unit 33. Target routes are computed based on subject vehicle current position measured by the GPS unit 34 and map data stored in the map database 35.

The communication unit 37 communicates through networks including the Internet and other wireless communication networks to access servers (not shown in the drawings) to acquire map data, traffic data and the like, periodically or at arbitrary times. Acquired map data are output to the map database 35 and/or memory unit 42 to update their stored map data. Acquired traffic data include congestion data and traffic light data including, for instance, time to change from red light to green light.

The actuators AC are provided to perform driving of the vehicle 101. The actuators AC include a throttle actuator 13 for adjusting opening angle of the throttle valve of the engine 1 (throttle opening angle), a shift actuator 23 for changing speed stage of the transmission 2, a brake actuator for operating a braking device, and a steering actuator for driving a steering unit.

The controller 40 is constituted by an electronic control unit (ECU). In FIG. 2, the controller 40 is integrally configured by consolidating multiple function-differentiated ECUs such as an engine control ECU, a transmission control ECU, a clutch control ECU and so on. Optionally, these ECUs can be individually provided. The controller 40 incorporates a computer including a CPU or other processing unit (a microprocessor) 41, the memory unit (a memory) 42 of RAM, ROM, hard disk and the like, and other peripheral circuits not shown in the drawings.

The memory unit 42 stores high-accuracy detailed map data including, inter alia, lane center position data and lane boundary line data. More specifically, road data, traffic regulation data, address data, facility data, telephone number data and the like are stored as map data. The road data include data identifying roads by type such as expressway, toll road and national highway, and data on, inter alia, number of road lanes, individual lane width, road gradient, road 3D coordinate position, lane curvature, lane merge and branch point positions, and road signs. The traffic regulation data include, inter alia, data on lanes subject to traffic restriction or closure owing to construction work and the like. The memory unit 42 also stores a shift map (shift chart) serving as a shift operation reference, various programs for performing processing, and threshold values used in the programs, etc.

As functional configurations, the processing unit 41 includes a subject vehicle position recognition unit 43, an exterior recognition unit 44, an action plan generation unit 45, and a driving control unit 46.

The subject vehicle position recognition unit 43 recognizes map position of the subject vehicle (subject vehicle position) based on subject vehicle position data calculated by the GPS unit 34 and map data stored in the map database 35. Optionally, the subject vehicle position can be recognized using map data (building shape data and the like) stored in the memory unit 42 and ambience data of the vehicle 101 detected by the external sensor group 31, whereby the subject vehicle position can be recognized with high accuracy. Optionally, when the subject vehicle position can be measured by sensors installed externally on the road or by the roadside, the subject vehicle position can be recognized with high accuracy by communicating with such sensors through the communication unit 37.

The exterior recognition unit 44 recognizes external circumstances around the subject vehicle based on signals from cameras, LIDERs, RADARs and the like of the external sensor group 31. For example, it recognizes position, speed and acceleration of nearby vehicles (forward vehicle or rearward vehicle) driving in the vicinity of the subject vehicle, position of vehicles stopped or parked in the vicinity of the subject vehicle, and position and state of other objects. The rearward vehicle at a rear of the self-driving vehicle includes following vehicle for following the self-driving vehicle. Other objects include traffic signs, traffic lights, road boundary and stop lines, buildings, guardrails, power poles, commercial signs, pedestrians, bicycles, and the like. Recognized states of other objects include, for example, traffic light color (red, green or yellow) and moving speed and direction of pedestrians and bicycles.

The action plan generation unit 45 generates a subject vehicle driving path (target path) from present time point to a certain time ahead based on, for example, a target route computed by the navigation unit 36, subject vehicle position recognized by the subject vehicle position recognition unit 43, and external circumstances recognized by the exterior recognition unit 44. When multiple paths are available on the target route as target path candidates, the action plan generation unit 45 selects from among them the path that optimally satisfies legal compliance, safe efficient driving and other criteria, and defines the selected path as the target path. The action plan generation unit 45 then generates an action plan matched to the generated target path. An action plan is also called "travel plan".

The action plan includes action plan data set for every unit time Δt (e.g., 0.1 sec) between present time point and a predetermined time period T (e.g., 5 sec) ahead, i.e., includes action plan data set in association with every unit time Δt interval. The action plan data include subject vehicle position data and vehicle state data for every unit time Δt. The position data are, for example, target point data indicating 2D coordinate position on road, and the vehicle state data are vehicle speed data indicating vehicle speed, direction data indicating subject vehicle direction, and the like. Therefore, when accelerating the subject vehicle to target vehicle speed within the predetermined time period T, the action plan includes target vehicle speed data. The vehicle state data can be determined from position data change of successive unit times Δt. Action plan is updated every unit time Δt.

Figure 3:
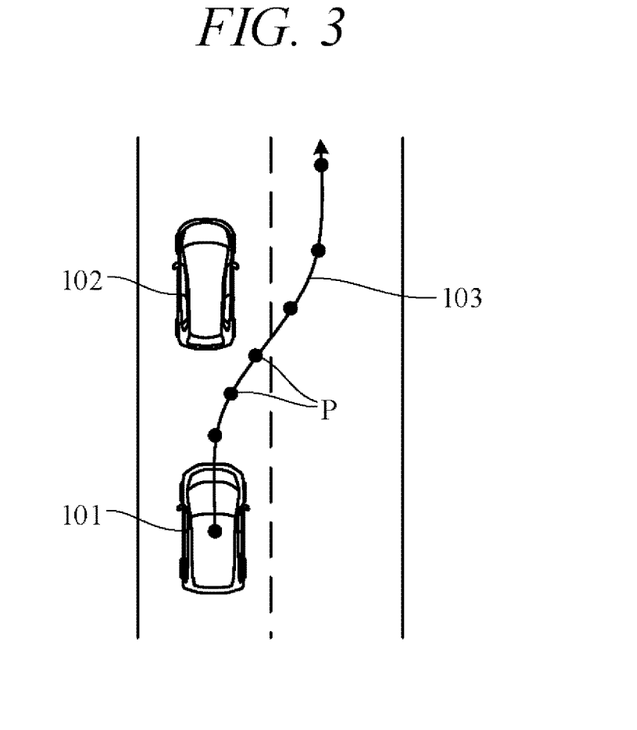
FIG. 3 is a diagram showing an example of an action plan generated by an action plan generation unit of FIG. 2.

FIG. 3 is a diagram showing an action plan generated by the action plan generation unit 45. FIG. 3 shows a scene depicting an action plan for the subject vehicle 101 when changing lanes and overtaking a vehicle 102 ahead. Points P in FIG. 3 correspond to position data at every unit time Δt between present time point and predetermined time period T1 ahead. A target path 103 is obtained by connecting the points P in time order. The action plan generation unit 45 generates not only overtake action plans but also various other kinds of action plans for, inter alia, lane-changing to move from one traffic lane to another, lane-keeping to maintain same lane and not stray into another, and decelerating or accelerating.

In self-drive mode, the driving control unit 46 controls the actuators AC to drive the subject vehicle 101 along target path 103 generated by the action plan generation unit 45. For example, the driving control unit 46 controls the throttle actuator 13, shift actuator 23, brake actuator and steering actuator so as to drive the subject vehicle 101 through the points P of the unit times Δt in FIG. 3.

More specifically, in self-drive mode, the driving control unit 46 calculates acceleration (target acceleration) of sequential unit times Δt based on vehicle speed (target vehicle speed) at points P of sequential unit times Δt on target path 103 (FIG. 3) included in the action plan generated by the action plan generation unit 45. In addition, the driving control unit 46 calculates required driving force for achieving the target accelerations taking running resistance caused by road gradient and the like into account. And the actuators AC are feedback controlled to bring actual acceleration detected by the internal sensor group 32, for example, into coincidence with target acceleration. On the other hand, in manual drive mode, the driving control unit 46 controls the actuators AC in accordance with driving instructions by the driver (accelerator opening angle and the like) acquired from the internal sensor group 32.

Controlling of the transmission 2 by the driving control unit 46 is explained concretely. The driving control unit 46 controls shift operation of the transmission 2 by outputting control signals to the shift actuator 23 using a shift map stored in the memory unit 42 in advance to serve as a shift operation reference.

Figure 4:
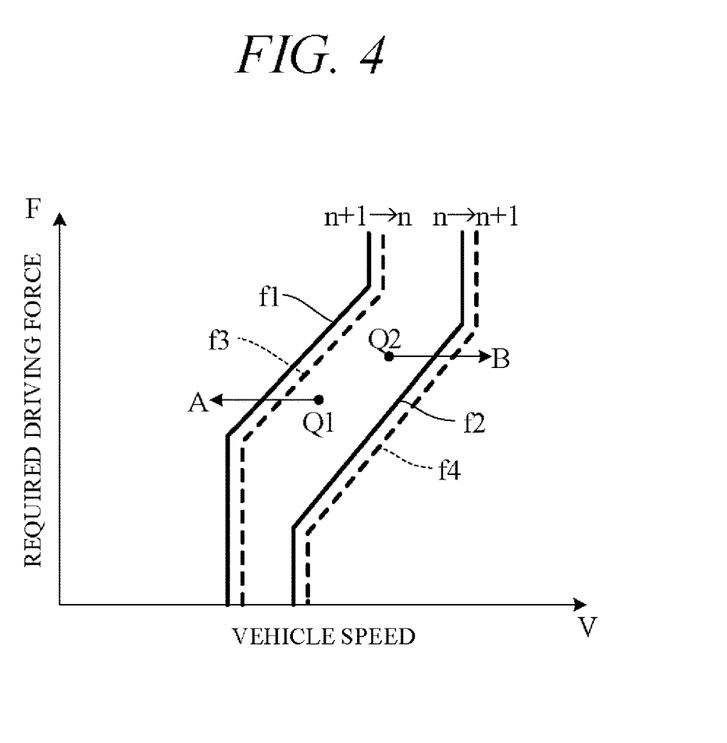
FIG. 4 is a diagram showing an example of a shift map used in shift controlling by the travel control apparatus according to the embodiment of the present invention.

FIG. 4 is a diagram showing an example of the shift map stored in the memory unit 42. In the drawing, horizontal axis is scaled for vehicle speed V and vertical axis for required driving force F. Required driving force F is in one-to-one correspondence to accelerator opening angle which is an amount of operation of an accelerator (in self-drive mode, simulated accelerator opening angle) or throttle opening angle, and required driving force F increases with increasing accelerator opening angle or throttle opening angle. Therefore, the vertical axis can instead be scaled for accelerator opening angle or throttle opening angle.

In FIG. 4, characteristic curve f1 (solid line) is an example of a downshift curve corresponding to downshift from n+1 stage to n stage in self-drive mode and characteristic curve f2 (solid line) is an example of an upshift curve corresponding to upshift from n stage to n+1 stage in self-drive mode. Characteristic curve f3 (dashed line) is an example of a downshift curve corresponding to downshift from n+1 stage to n stage in manual drive mode and characteristic curve f4 (dashed line) is an example of an upshift curve corresponding to upshift from n stage to n+1 stage in manual drive mode. Characteristic curves f3 and f4 are shifted to high vehicle speed side than characteristic curves f1 and f2, respectively.

For example, considering downshift from operating point Q1 in FIG. 4, in a case where vehicle speed V decreases under constant required driving force F, the transmission 2 downshifts from n+1 stage to n stage when operating point Q1 crosses downshift curves (characteristic curves f1, f3; arrow A). Also, in a case where required driving force F increases under constant vehicle speed V, the transmission 2 downshifts when operating point Q1 crosses downshift curves.

On the other hand, considering upshift from operating point Q2, in a case where vehicle speed V increases under constant required driving force F, the transmission 2 upshifts from n stage to n+1 stage when operating point Q2 crosses upshift curves (characteristic curves f2, f4; arrow B). Also, in a case where required driving force F decreases under constant vehicle speed V, the transmission 2 upshifts when operating point Q1 crosses upshift curves. Downshift curves and upshift curves are shifted to high speed side along with an increase of speed stage.

Characteristic curves f3 and f4 in manual drive mode are characteristic curves that balance fuel economy performance and power performance. On the other hand, characteristic curves f1 and f2 in self-drive mode are characteristic curves that prioritize fuel economy performance or silent performance over power performance. Since characteristic curves f1 and f2 are shifted to low vehicle speed side than characteristic curves f3 and f4, upshift time is advanced and downshift time is delayed in self-drive mode. Therefore, the subject vehicle in self-drive mode tends to travel at speed stage greater than in manual drive mode.

Figure 5A:
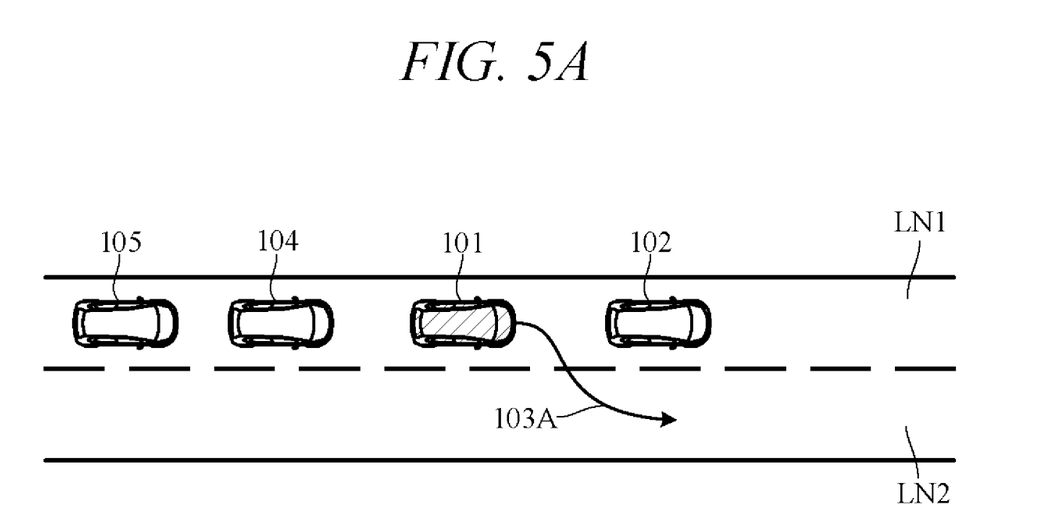
FIG. 5A is a diagram showing an example of operation when a vehicle makes a lane change from slow lane to passing lane in order to overtake a forward vehicle.
Figure 5B:
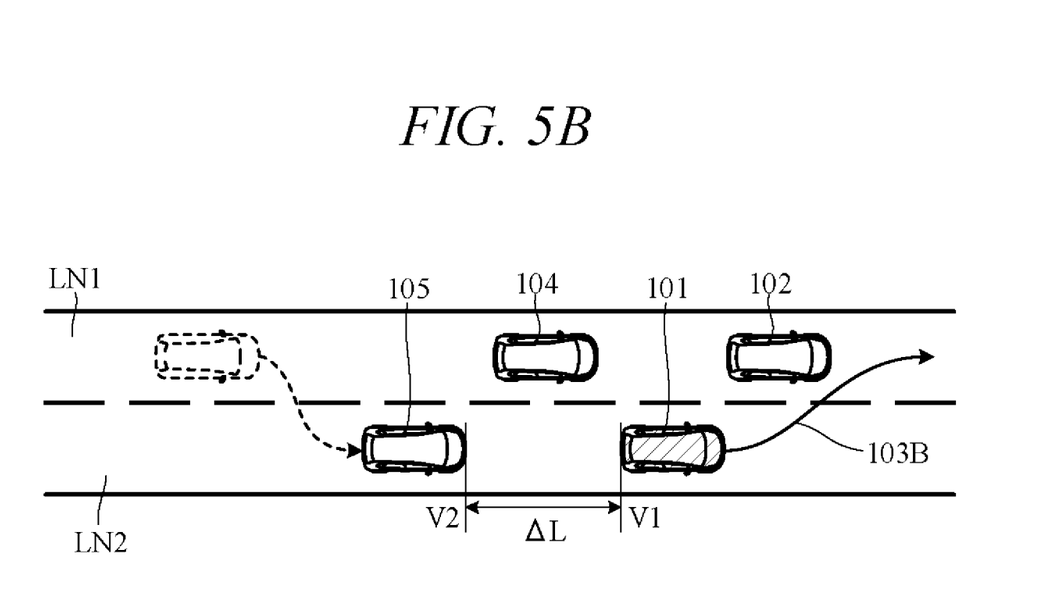
FIG. 5B is a diagram showing an example of operation when the vehicle makes a lane change from passing lane to slow lane in order to overtake the forward vehicle.

Characterizing features of the travel control apparatus according to the present embodiment are explained in the following. The travel control apparatus according to the present embodiment is characterized by a configuration for implementing control when a vehicle (herein often termed a subject vehicle) changes lanes and overtakes a forward vehicle at a front of the subject vehicle. An example of subject vehicle behavior in the course of overtaking a forward vehicle is taken up first. FIGS. 5A and 5B are left-hand traffic diagrams showing behavior of the subject vehicle 101 (distinguished by hatching) running in slow lane (regular speed lane) LN1 of an expressway or ordinary highway with two lanes in each direction when it changes lanes to passing lane (overtaking lane) LN2 in order to overtake a forward vehicle 102.

In FIG. 5A, the subject vehicle 101 is shown to be followed by two vehicles (rearward vehicles at area of the subject vehicle) 104 and 105 in slow lane LN1, with no rearward vehicle present in passing lane LN2. When the action plan generation unit 45 of FIG. 2 responds to this condition by generating an action plan for overtaking a vehicle 102 ahead, the subject vehicle 101 starts to change lanes along, for example, target path 103A indicated by an arrow. Once the subject vehicle 101 completes the lane change to passing lane LN2 as shown in FIG. 5B, it travels, for example, along a target path 103B indicated by an arrow (solid line) to return to slow lane LN1 after overtaking the forward vehicle 102.

In the course of such overtaking, e.g., after the subject vehicle 101 changes lanes to passing lane LN2, another vehicle, e.g., the rearward vehicle 105, may change lanes to passing lane LN2, as indicated by an arrow (dashed line) in FIG. 5B. Should vehicle speed V2 of the rearward vehicle 105 be faster than vehicle speed V1 of the subject vehicle 101 at this time, a risk arises of inter-vehicle distance ΔL between the subject vehicle 101 and the rearward vehicle 105 shrinking to shorter than a predefined allowable inter-vehicle distance (herein termed a shortest inter-vehicle distance ΔLa) required at vehicle speed V1 concerned.

When enough space is available between the forward vehicle 102 and the rearward vehicle 104 in such a case, the subject vehicle 101 can discontinue overtake activity and return to slow lane LN1. However, it cannot return to slow lane LN1 when, as in the case shown in FIG. 5B, adequate space is not available between the forward vehicle 102 and the rearward vehicle 104. The travel control apparatus according to the present embodiment is therefore configured as set out hereinafter in order to enable safe overtaking with consideration to surrounding circumstances in such situations.

Figure 6:
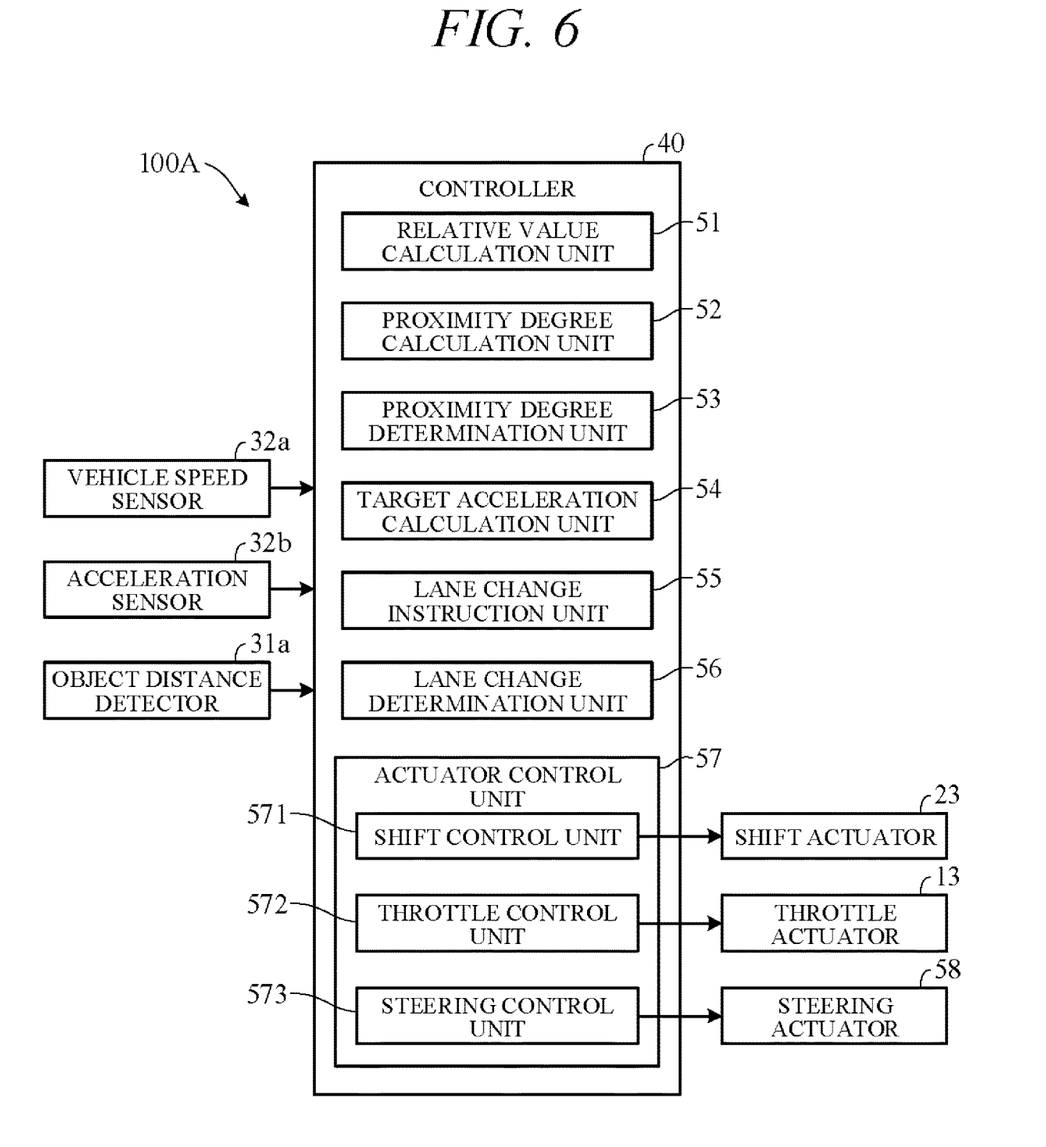
FIG. 6 is a block diagram illustrating main configuration of the travel control apparatus of the self-driving vehicle according to the embodiment of the present invention.

FIG. 6 is a block diagram showing main configurations of a travel control system 100A in accordance with an embodiment of the present invention. The travel control apparatus 100A, which constitutes part of the vehicle control system 100 of FIG. 2, is an apparatus for enabling the subject vehicle 101 to overtake other vehicles by autonomous driving. As shown in FIG. 6, the controller 40 (processing unit 41 of FIG. 2) receives signal input from a vehicle speed sensor 32a for detecting vehicle speed, an acceleration sensor 32b for detecting acceleration, and an object distance detector 31a for detecting presence or absence of object in vicinity of subject vehicle and distance from subject vehicle to object in the vicinity. The vehicle speed sensor 32a and acceleration sensor 32b are members of the internal sensor group 32 of FIG. 2. The object distance detector 31a, which is a member of the external sensor group 31 of FIG. 2, includes, inter alia, RADARs or LIDARs and cameras.

The controller 40 includes a relative value calculation unit 51, a proximity degree calculation unit 52, a proximity degree determination unit 53, a target acceleration calculation unit 54, a lane change instruction unit 55, a lane change determination unit 56, and an actuator control unit 57. Among these, the relative value calculation unit 51, proximity degree calculation unit 52, proximity degree determination unit 53 and lane change determination unit 56 are, for example, configured by the action plan generation unit 45 of FIG. 2, and the target acceleration calculation unit 54, lane change instruction unit 55 and actuator control unit 57 are, for example, configured by the driving control unit 46 of FIG. 2.

The relative value calculation unit 51 uses the object distance detector 31a to detect inter-vehicle distance ΔL between a rearward vehicle following the subject vehicle in the same lane (e.g., passing lane LN2) and the subject vehicle, and determines relative speed ΔV (=V2−V1) between speed V1 of the subject vehicle and speed V2 of the rearward vehicle by calculating time derivative of inter-vehicle distance ΔL. When calculated relative speed ΔV is positive value, the rearward vehicle is approaching the subject vehicle, and when calculated relative speed ΔL is negative value, the rearward vehicle is departing (dropping back) from the subject vehicle. The relative value calculation unit 51 additionally determines relative acceleration ΔG by calculating time derivative of calculated relative speed ΔV.

The proximity degree calculation unit 52 calculates degree of proximity to the subject vehicle of the rearward vehicle following subject vehicle. More specifically, proximity degree calculation unit 52 first calculates, based on overtake action plan, time period required from current time until the subject vehicle changes lanes back to original slow lane LN1 after overtaking the forward vehicle (herein termed a required lane change time ta). The relative value calculation unit 51 additionally uses calculated relative speed ΔV and relative acceleration ΔG to calculate shortest distance of approach of the rearward vehicle to the subject vehicle within required lane change time ta (herein termed a closest approach distance ΔLb). Closest approach distance ΔLb is a parameter representing degree of proximity of the rearward vehicle relative to the subject vehicle. Degree of proximity increases in proportion as closest approach distance ΔLb is shorter.

The proximity degree determination unit 53 determines whether proximity degree calculated by the proximity degree calculation unit 52 is equal to or greater than a predetermined value. Specifically, it determines whether closest approach distance ΔLb calculated by the proximity degree calculation unit 52 is equal to or less than a predetermined value stored in advance in the memory unit 42. Although predetermined value can be either greater or less than shortest inter-vehicle distance ΔLa, it is taken to be equal to shortest inter-vehicle distance ΔLa in the following explanation.

When the proximity degree determination unit 53 determines that closest approach distance ΔLb is longer than shortest inter-vehicle distance ΔLa, the target acceleration calculation unit 54 calculates, based on action plan at time closest approach distance ΔLb is calculated, desired subject vehicle acceleration (herein termed a standard target acceleration Ga). Standard target acceleration Ga is same as target acceleration when no vehicle is present behind.

On the other hand, when the proximity degree determination unit 53 determines that closest approach distance ΔLb is equal to or less than shortest inter-vehicle distance ΔLa, the target acceleration calculation unit 54 calculates desired acceleration for making closest approach distance ΔLb equal to shortest inter-vehicle distance ΔLa, namely, acceleration greater than standard target acceleration Ga, herein termed an increased target acceleration Gb. Increased target acceleration Gb is calculated as function of length of closest approach distance ΔLb so as to increase as length of closest approach distance ΔLb shortens. Target accelerations Ga and Gb are accelerations at time of accelerating until vehicle speed V detected by the vehicle speed sensor 32a reaches vehicle speed Va.

The lane change instruction unit 55 is responsive to surrounding circumstances of the subject vehicle recognized by the exterior recognition unit 44 (FIG. 2) for instructing lane change from slow lane LN1 to passing lane LN2 in order to overtake forward vehicle or lane change from passing lane LN2 to slow lane LN1 after overtaking forward vehicle. The lane change instruction unit 55 also sometimes instructs lane change from passing lane LN2 to slow lane LN1 without overtaking forward vehicle.

The lane change determination unit 56 is responsive to surrounding circumstances of the subject vehicle recognized by the exterior recognition unit 44 (FIG. 2) for determining whether lane change from slow lane LN1 to passing lane LN2 or from passing lane LN2 to slow lane LN1 is possible. For example, the lane change determination unit 56 determines whether lane change from slow lane LN1 to passing lane LN2 such as shown in FIG. 5A is possible. Moreover, the lane change determination unit 56 determines whether the subject vehicle 101 can change lanes into a space between the forward vehicle 102 and the rearward vehicle 104 as shown in FIG. 5B, while taking relative speeds between the subject vehicle 101 and each of the forward vehicle 102 and rearward vehicle 104 into consideration along with other factors.

The actuator control unit 57 includes a shift control unit 571, a throttle control unit 572 and a steering control unit 573. The shift control unit 571 controls speed ratio shifting of the transmission 2 by outputting control signals to the shift actuator 23 in accordance with target accelerations Ga and Gb calculated by the target acceleration calculation unit 54. The throttle control unit 572 controls engine torque by outputting control signals to the throttle actuator 13 in accordance with target accelerations Ga and Gb calculated by the target acceleration calculation unit 54. The steering control unit 573 controls steering action of a steering unit by outputting control signals to a steering actuator 58 in accordance with instruction from the lane change instruction unit 55. Although not shown in the drawings, the actuator control unit 57 also includes, inter alia, a braking controller for controlling the brake actuator.

Figure 7:
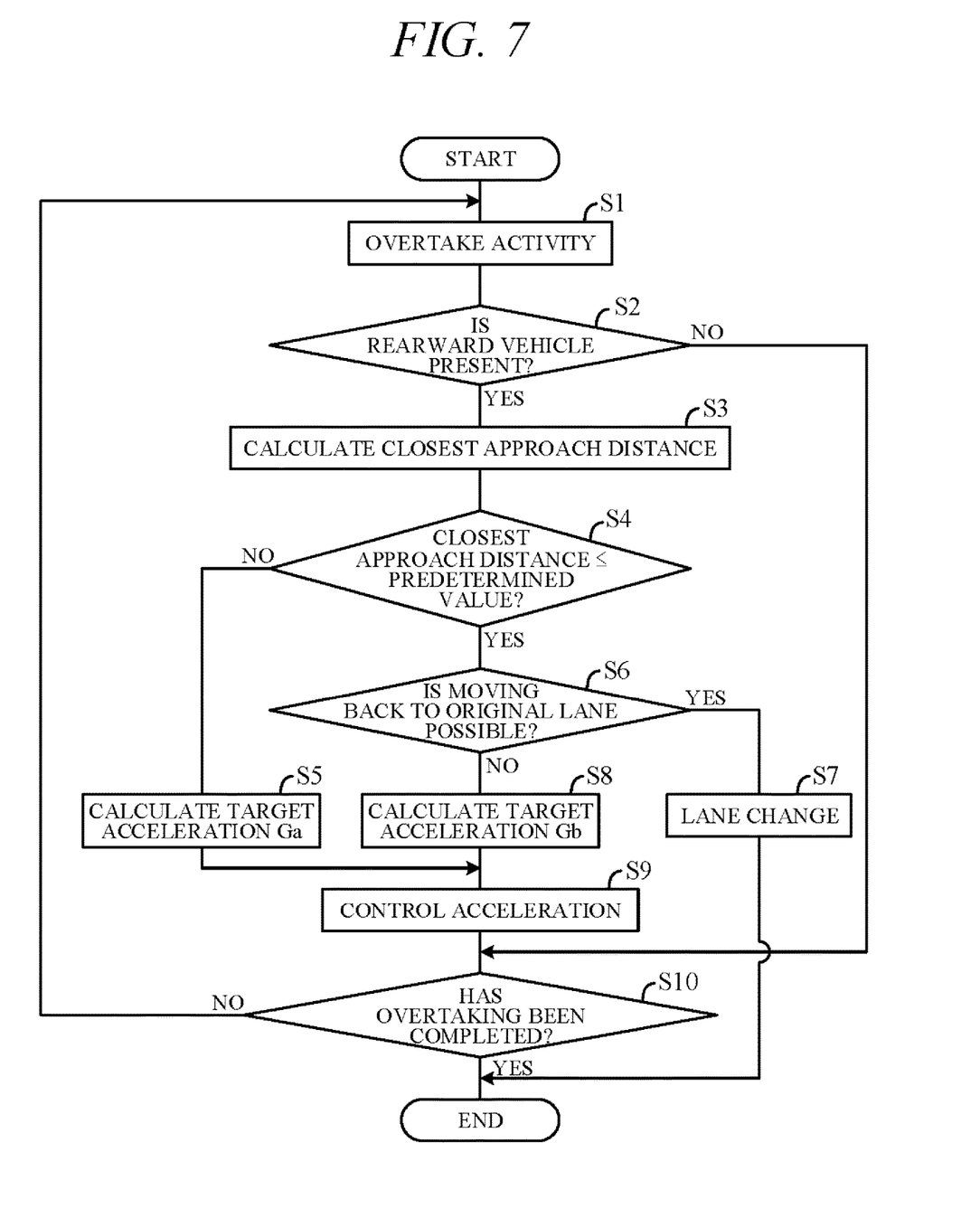
FIG. 7 is a flow chart showing an example of processing performed by a processing unit of FIG. 6.

FIG. 7 is a flowchart showing an example of processing performed by the controller 40 of FIG. 6 (processing unit 41 of FIG. 2) in accordance with a program stored in the memory unit 42 (FIG. 2) in advance. Processing shown in this flowchart is started, for example, when the action plan generation unit 45 generates an overtake action plan based on target route calculated by the navigation unit 36, subject vehicle position recognized by the subject vehicle position recognition unit 43, and external conditions recognized by the exterior recognition unit 44.

First, in S1 (S: processing Step), overtake activity is commenced by outputting control signals to the actuator control unit 57 based on an action plan generated by the action plan generation unit 45. Next, in S2, whether another vehicle is present behind the subject vehicle (e.g., rearward vehicle 105 of FIG. 5B) in the same lane as the subject vehicle is determined based on signals from the object distance detector 31a. If positive decision is made in S2, the routine proceeds to S3, in which the proximity degree calculation unit 52 calculates required lane change time ta to completion of overtake and calculates closest approach distance ΔLb, namely, closest distance to which the rearward vehicle approaches the subject vehicle during required lane change time ta.

Next, in S4, the proximity degree determination unit 53 determines whether closest approach distance ΔLb calculated in S3 is equal to or less than predetermined value (shortest inter-vehicle distance ΔLa) stored in the memory unit 42 in advance. If a negative decision is made in S4, the routine proceeds to S5, in which the target acceleration calculation unit 54 calculates desired acceleration (standard target acceleration Ga) of subject vehicle based on the action plan when closest approach distance ΔLb has been calculated in S4. In this case, no need to increase the target acceleration arises and standard target acceleration Ga like that when no vehicle is present behind is calculated.

On the other hand, if a positive decision is made in S4, the routine proceeds to S6, in which the lane change determination unit 56 determines whether moving back to original lane before lane change (e.g., slow lane LN1) is possible. If a positive decision is made in S6, the routine proceeds to S7, in which the lane change instruction unit 55 instructs lane change back to original slow lane LN1. The actuator control unit 57 therefore outputs control signals to the steering actuator 58, etc. to control the subject vehicle so as to discontinue overtake activity and change lanes to, for example, behind the forward vehicle (between the forward vehicle 102 and the rearward vehicle 104 in FIG. 5B), whereupon processing is terminated.

If a negative decision is made in S6, the routine proceeds to S8, in which the target acceleration calculation unit 54 calculates desired acceleration (increased target acceleration Gb) for making closest approach distance ΔLb equal to shortest inter-vehicle distance ΔLa. In this case, the action plan generation unit 45 revises the initial action plan so that closest approach distance ΔLb becomes equal to shortest inter-vehicle distance ΔLa, and the target acceleration calculation unit 54 calculates increased target acceleration Gb based on the revised action plan.

Next, in S9, the throttle control unit 572 outputs a control signal to the throttle actuator 13 for bringing actual acceleration detected by the acceleration sensor 32b into coincidence with target acceleration Ga or Gb calculated in S5 or S8. At this time, maximum vehicle speed V detected by the vehicle speed sensor 32a is restricted to target vehicle speed Vα of the action plan. Additionally in S9, the shift control unit 571 refers to a shift map (e.g., characteristic curve f1 of FIG. 4) stored in the memory unit 42 in advance to determine whether downshifting is necessary for obtaining target acceleration Ga or GB. And when downshifting is determined to be necessary, the shift control unit 571 downshifts the transmission 2 by outputting a control signal to the shift actuator 23. Optionally, need for downshifting during overtaking can be determined using characteristics different from those of the ordinary shift map (e.g., using early downshift characteristics such as those of characteristic curve f3 of FIG. 4).

Upon completion of the processing of S9, or if a negative decision is made in S2, the routine proceeds to S10. In S10, whether overtaking has been completed is determined based on external conditions and the like recognized by the exterior recognition unit 44. In other words, whether overtaking of forward vehicle 102 and lane change into space ahead of forward vehicle 102 has been completed is determined. If a negative decision is made in S10, the routine returns to S1 to repeat the aforesaid processing. If a positive decision is made in S10, the processing is terminated.

Figure 8:
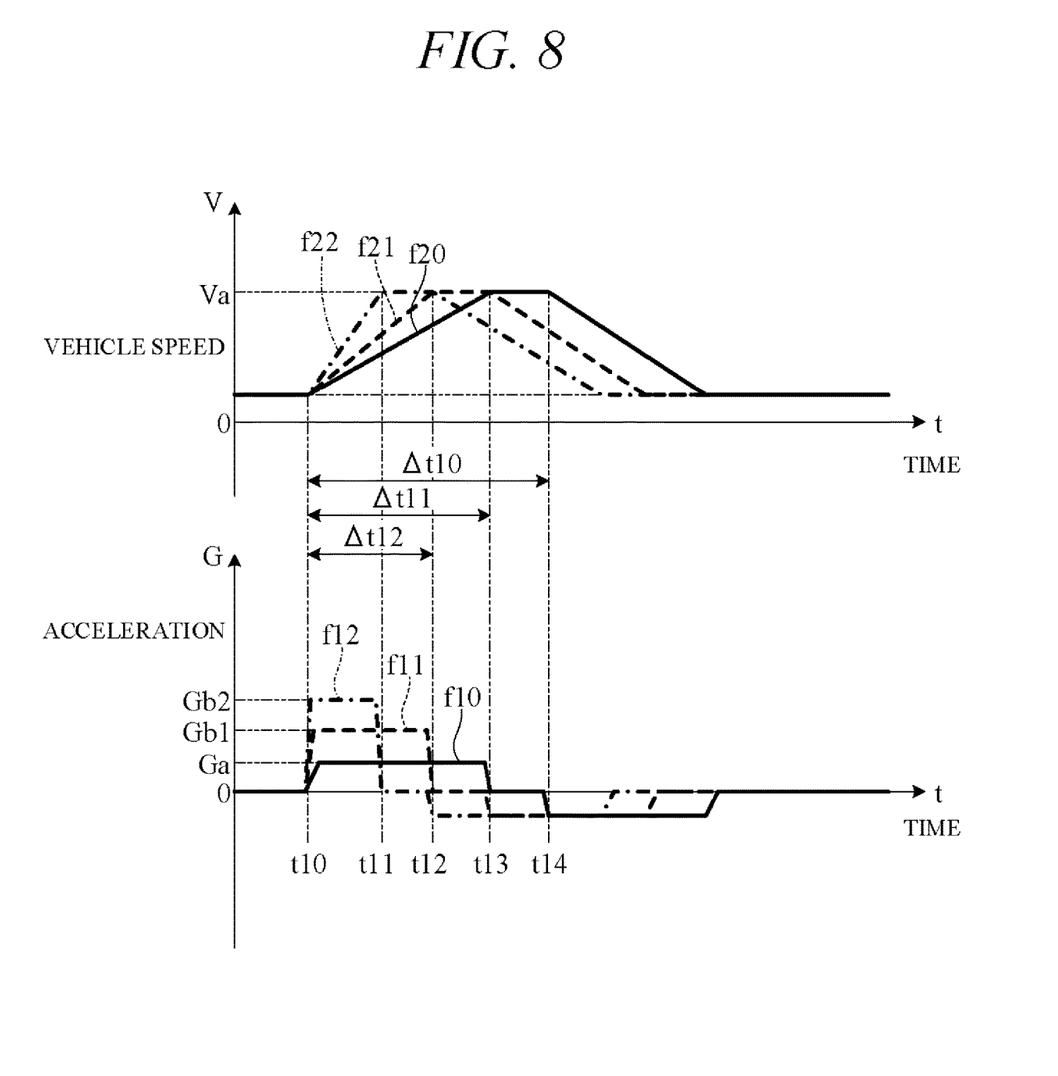
FIG. 8 is a time chart showing an example of change of vehicle speed and acceleration in accordance with a lapse of time during vehicle overtaking by the travel control apparatus of FIG. 6.

A more detailed explanation of operation of the travel control apparatus 100A according to the present embodiment follows. FIG. 8 is a time chart showing an example of changes of vehicle speed V and acceleration G in accordance with a lapse of time during vehicle overtaking. Characteristic curve f10 (solid line) represents standard target acceleration Ga characteristics, and characteristic curve f11 (dashed line) and characteristic curve f12 (one-dot-dashed line) represent increased target acceleration Gb (Gb1 and Gb2) characteristics. Gb1 is maximum acceleration producible in current speed ratio stage, and Gb2 is acceleration greater than Gb1 producible in speed ratio stage after downshifting. Characteristic curve f20 (solid line), characteristic curve f21 (dashed line) and characteristic curve f22 (one-dot-dashed line) in the drawing represent vehicle speed V characteristics corresponding to characteristic curves f10, f11 and f12, respectively.

As indicated in characteristic curve f10 of FIG. 8, when closest approach distance ΔLb during overtaking is longer than shortest inter-vehicle distance ΔLa, acceleration G rises at time t10 and is controlled to standard target acceleration Ga (S5→S9). As shown in characteristic curve f20, when vehicle speed V rises to target vehicle speed Vα under this condition, acceleration G becomes 0 at time t13 and vehicle speed V is maintained at target vehicle speed Va. Upon completion of overtake activity at time t14, acceleration G becomes negative and vehicle speed V falls to a predetermined vehicle speed (e.g., vehicle speed for following a forward vehicle), whereafter the predetermined vehicle speed is maintained.

When closest approach distance ΔLb after lane change is shorter than shortest inter-vehicle distance ΔLa, acceleration G is controlled to increased target acceleration Gb1 as shown, for example, in characteristic curve f11 (S8→S9). As shown in characteristic curve f21, when under this condition vehicle speed V rises to target vehicle speed Vα at time t12, acceleration G becomes 0 and vehicle speed V is maintained at target vehicle speed Va. Upon completion of overtake activity at time t13, vehicle speed V falls to predetermined vehicle speed.

When degree of proximity of the rearward vehicle 105 is great, acceleration G is controlled to increased target acceleration Gb2 (>Gb1), as shown in characteristic curve f12, by, for example, downshifting the transmission 2 (S8→S9). As shown in characteristic curve f22, when under this condition vehicle speed V rises to target vehicle speed Vα at time t11, acceleration G becomes 0 and vehicle speed V is maintained at target vehicle speed Va. Upon completion of overtake activity at time t12, vehicle speed V falls to predetermined vehicle speed. When closest approach distance ΔLb after lane change is shorter than shortest inter-vehicle distance ΔLa but returning to original lane is possible, the subject vehicle discontinues overtake activity and returns to original lane (S6→S7).

Thus in the present embodiment, running acceleration G is increased in proportion as degree of proximity of the rearward vehicle to the subject vehicle after lane change is greater (as closest approach distance ΔLb is shorter). Since vehicle speed V can therefore be promptly accelerated up to target vehicle speed Va, time periods Δt10 (t10 to t14), Δt11 (t10 to t13), Δt12 (t10 to t12) required to complete overtake activity are shorter in proportion as degree of proximity is greater (Δt10>Δt11>Δt12).

The present embodiment can achieve advantages and effects such as the following:

(1) The travel control apparatus 100A of the self-driving vehicle 101 according to the present embodiment, which is configured to control the actuators AC for driving the subject vehicle 101 having autonomous driving capability, includes: the proximity degree calculation unit 52 for calculating degree of proximity of the rearward vehicle to the subject vehicle; the proximity degree determination unit 53 for determining whether degree of proximity calculated by the proximity degree calculation unit 52 is equal to or greater than a predetermined degree, namely, whether closest approach distance ΔLb is equal to or less than shortest inter-vehicle distance ΔLa; and the actuator control unit 57 for controlling actuators AC (throttle actuator 13 and shift actuator 23) to increase subject vehicle acceleration G more when ΔLb≤ΔLa is determined than when ΔLb>ΔLa is determined by the proximity degree determination unit 53 (FIG. 6).

Owing to this configuration, when a rearward vehicle approaches the subject vehicle from behind after the subject vehicle changed to passing lane LN2, for example, and no space is available for return of the subject vehicle to original lane LN1, the travel control apparatus 100A increases acceleration G in accordance with inter-vehicle distance ΔL between the subject vehicle and the rearward vehicle (closest approach distance ΔLb). The subject vehicle can therefore perform vehicle overtaking in optimum manner with consideration to surrounding circumstances. In other words, notwithstanding that running of a rearward vehicle might be obstructed owing to shortening of inter-vehicle distance ΔL should a forward vehicle of it continue overtake activity without increasing its acceleration G, the travel control apparatus 100A avoids this risk by increasing acceleration G so as to maintain inter-vehicle distance ΔL of or greater than shortest inter-vehicle distance ΔLa, thereby ensuring optimum vehicle overtaking without interfering with running of a following vehicle.

(2) The subject vehicle includes the engine 1 for generating vehicle driving force and the transmission 2 installed in the power transmission path from the engine 1 to the drive wheels 3 (FIG. 1). The shift control unit 571 controls the shift actuator 23 so as to downshift the transmission 2 in accordance with degree of proximity of the rearward vehicle calculated by the proximity degree calculation unit 52. Therefore, even when target acceleration is large owing to high degree of proximity, actual acceleration G can be easily controlled to target acceleration (e.g., to increased target acceleration Gb2), whereby vehicle overtaking optimum for the proximity degree can be realized.

(3) The travel control apparatus 100A further includes the exterior recognition unit 44 for recognizing surrounding circumstances of the subject vehicle and the lane change instruction unit 55 responsive to surrounding circumstances of the subject vehicle recognized by the exterior recognition unit 44 for instructing lane change from slow lane LN1 to passing lane LN2 in order to overtake the forward vehicle or lane change from passing lane LN2 to slow lane LN1 after overtaking the forward vehicle (FIGS. 2 and 6). The actuator control unit 57 (steering control unit 573) controls the steering actuator 58 so that the subject vehicle changes lanes in accordance with instruction from the lane change instruction unit 55. Although such lane changing is susceptible to the possibility of another vehicle (rearward vehicle) rapidly approaching the subject vehicle after lane change, the present embodiment can perform optimum lane changing in the course of overtake activity because it is configured to change subject vehicle acceleration in accordance with degree of proximity of the rearward vehicle.

(4) The travel control apparatus 100A further includes the lane change determination unit 56 for determining whether lane change from passing lane LN2 to slow lane LN1 is possible after the subject vehicle changed lanes from slow lane LN1 to passing lane LN2 (FIG. 6). When the proximity degree determination unit 53 determines that degree of proximity of the rearward vehicle is equal to or greater than predetermined degree (ΔLb≤ΔLa) and the lane change determination unit 56 determines that lane change from passing lane LN2 to slow lane LN1 is possible, the lane change instruction unit 55 further instructs that lane change from passing lane LN2 to slow lane LN1 be performed before (without) overtaking the forward vehicle. Since this enables the subject vehicle to discontinue overtaking activity when another vehicle approaches from behind and makes return to original lane possible, instances of the subject vehicle running at higher than target acceleration set by the initial action plan are less frequent.

In the foregoing, a mode is explained in which vehicle acceleration G is increased in accordance with degree of proximity of another vehicle approaching the subject vehicle from behind when the subject vehicle is attempting to overtake a forward vehicle. Optionally, however, maximum value of vehicle speed V can be increased instead of increasing acceleration G. An explanation of this aspect follows.

Figure 9:
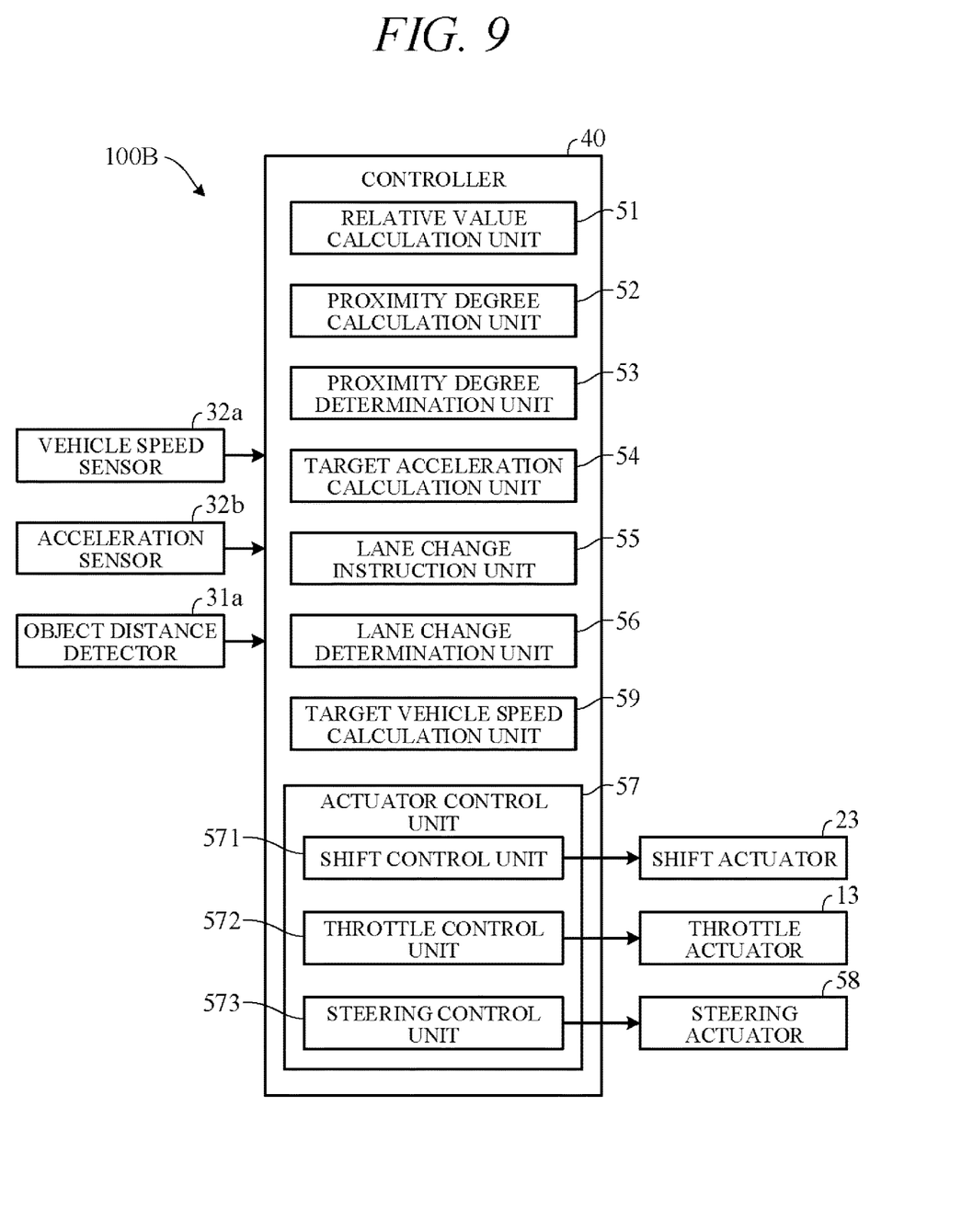
FIG. 9 is a block diagram illustrating main configuration different from FIG. 6 of the travel control apparatus of the self-driving vehicle according to the embodiment of the present invention.

FIG. 9 is a block diagram, similar to that of FIG. 6, showing main configurations of a travel control system 100B in accordance with an embodiment of the present invention. The embodiment of FIG. 9 differs from that of FIG. 6 in that its controller 40 includes a target vehicle speed calculation unit 59 and that its target acceleration calculation unit 54 is configured differently. Specifically, the target acceleration calculation unit 54 of FIG. 6 calculates either standard target acceleration Ga or increased target acceleration Gb depending on degree of proximity of the rearward vehicle, but the target acceleration calculation unit 54 of FIG. 9 calculates only standard target acceleration Ga irrespective of degree of proximity of the rearward vehicle.

When the proximity degree determination unit 53 determines that closest approach distance ΔLb is longer than shortest inter-vehicle distance ΔLa, the target vehicle speed calculation unit 59 calculates, based on action plan at time closest approach distance ΔLb has been calculated, target speed of the subject vehicle (herein termed a standard target vehicle speed Vα). Standard target vehicle speed Vα is same as target vehicle speed set when no vehicle is present behind. Optionally, standard target vehicle speed Vα can be equal to target vehicle speed Vα of FIG. 8.

On the other hand, when the proximity degree determination unit 53 determines that closest approach distance ΔLb is equal to or less than shortest inter-vehicle distance ΔLa, the target vehicle speed calculation unit 59 calculates target vehicle speed (herein termed an increased target vehicle speed Vβ) for making closest approach distance ΔLb equal to shortest inter-vehicle distance ΔLa, namely, vehicle speed greater than standard target vehicle speed Vα. Increased target vehicle speed Vβ is calculated in accordance with relative speed ΔV between subject vehicle and rearward vehicle calculated by the relative value calculation unit 51. Increased target vehicle speed Vβ is faster in proportion as relative speed ΔV is larger (degree of proximity is greater). Optionally, relative speed ΔV can be calculated in accordance with length of closest approach distance ΔLb, in which case increased target vehicle speed Vβ is faster in proportion as, for example, closest approach distance ΔLb is shorter. Increased target vehicle speed VP is set equal to or less than legal vehicle speed limit.

The actuator control unit 57 controls the throttle actuator 13 and shift actuator 23 so as to bring maximum vehicle speed V during vehicle overtaking detected by the vehicle speed sensor 32a into coincidence with target vehicle speed Vα or VP. Acceleration at this time is controlled to standard target acceleration Ga.

Figure 10:
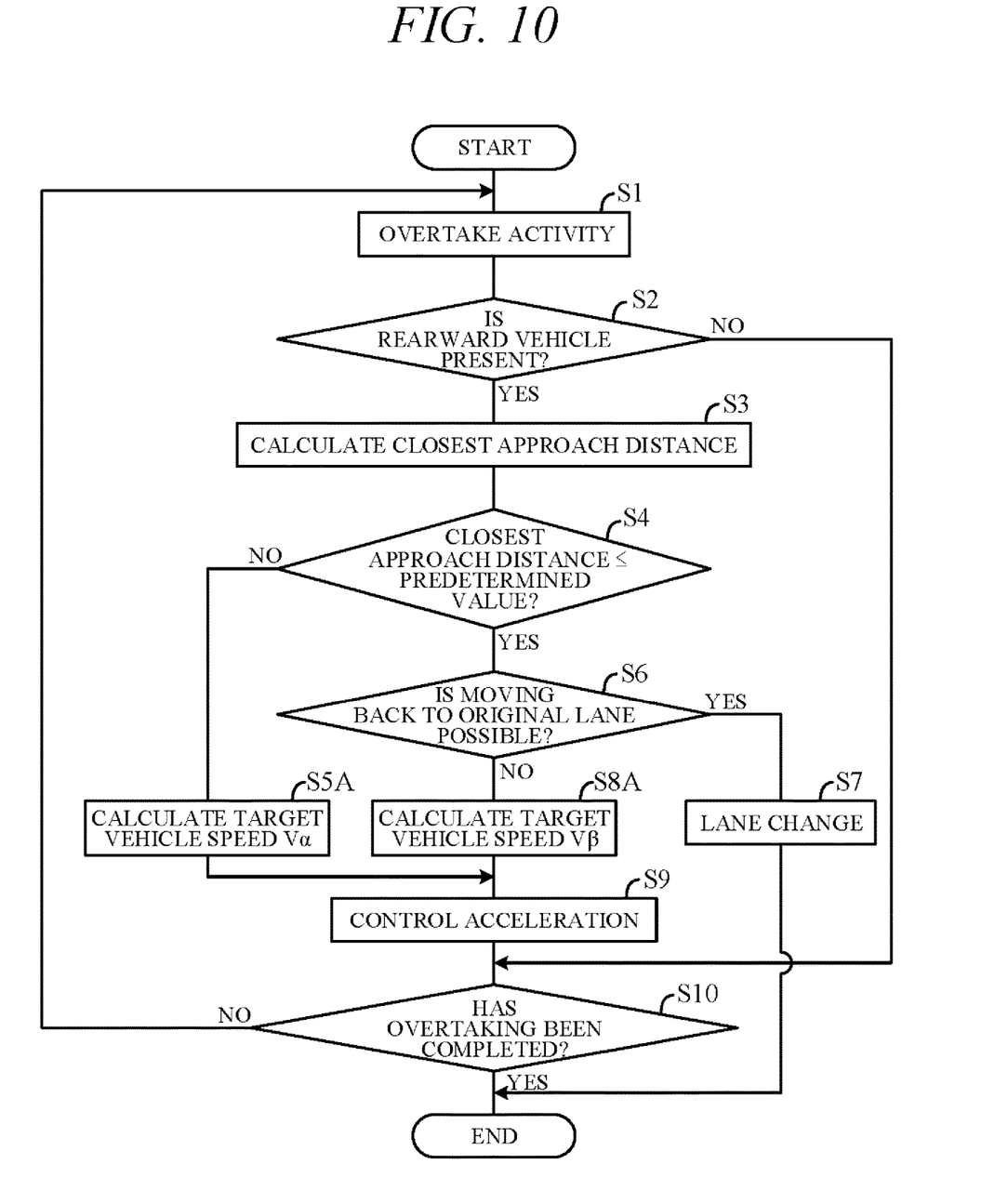
FIG. 10 is a flow chart showing an example of processing performed by a processing unit of FIG. 9.

FIG. 10 is a flowchart showing an example of processing performed by the controller 40 of FIG. 9 (processing unit 41 of FIG. 2) in accordance with a program stored in the memory unit 42 (FIG. 2) in advance. Part of processing in common with those of FIG. 7 are assigned like reference symbols and the ensuing explanation is focused mainly on points of difference from the flowchart of FIG. 7.

As shown in FIG. 10, if closest approach distance ΔLb is determined in S4 to be greater than shortest inter-vehicle distance ΔLa, the routine proceeds to S5A. In S5A, the target vehicle speed calculation unit 59 calculates, based on action plan at time closest approach distance ΔLb has been calculated in S4, target speed of the subject vehicle 101 (standard target vehicle speed Vα). In this case, no need to increase target vehicle speed arises and standard target vehicle speed like that when no vehicle is present behind is calculated.

On the other hand, if closest approach distance ΔLb is determined to be equal to or less than shortest inter-vehicle distance ΔLa in S4 and moving back to original lane before lane change is determined to be impossible in S6, the routine proceeds to S8A. In S8A, the target vehicle speed calculation unit 59 calculates desired vehicle speed (increased target vehicle speed Vβ) in accordance with relative speed ΔV calculated by the relative value calculation unit 51. For example, it calculates increased target vehicle speed Vβ for making closest approach distance ΔLb equal to shortest inter-vehicle distance ΔLa. The action plan generation unit 45 modifies the initial action plan (maximum value of target vehicle speed) in accordance with increased target vehicle speed VP.

Upon calculation of target vehicle speed Vα or Vβ calculated in S5A or S8A, the routine proceeds to S9. In S9, the throttle control unit 572 outputs a control signal to the throttle actuator 13 for bringing actual acceleration detected by the acceleration sensor 32b into coincidence with standard target acceleration Ga. At this time, maximum vehicle speed V detected by the vehicle speed sensor 32a is restricted to target vehicle speed Vα or Vβ in accordance with the action plan.

Figure 11:
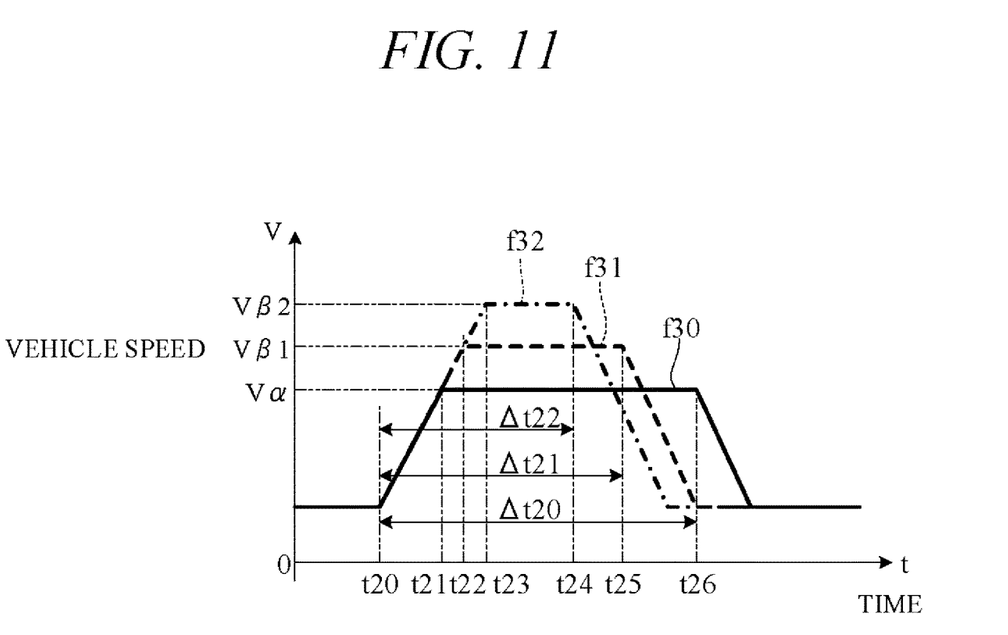
FIG. 11 is a time chart showing an example of change of vehicle speed and acceleration in accordance with a lapse of time during vehicle overtaking by the travel control apparatus of FIG. 9.

FIG. 11 is a time chart showing an example of actions of the travel control apparatus 100B in accordance with the flowchart of FIG. 10. Characteristic curve f30 (solid line) in the drawing represents standard target vehicle speed Vα characteristics, and characteristic curve f31 (dashed line) and characteristic curve f32 (one-dot-dashed line) represent increased target vehicle speed Vβ (Vβ1 and Vβ2) characteristics. Vβ2 is maximum value of target vehicle speed (e.g., legal vehicle speed limit), and Vβ1 is lower than Vβ2. Optionally, lower of speed V2 of the rearward vehicle and legal limit speed can be used as value of maximum target vehicle speed Vβ2.

As shown in characteristic curve f30 of FIG. 11, when closest approach distance ΔLb during vehicle overtaking is longer than shortest inter-vehicle distance ΔLa, vehicle speed V is increased under predetermined acceleration Ga at time t20 and controlled to standard target vehicle speed Vα at time t21 (S5A→S9). When overtake activity is thereafter completed at time t26, vehicle speed V decreases from Vα to predetermined vehicle speed (e.g., vehicle speed for following the forward vehicle), whereafter the predetermined vehicle speed is maintained.

As shown in characteristic curve f31 or characteristic curve f32 of FIG. 11, for example, when closest approach distance ΔLb after lane change is shorter than shortest inter-vehicle distance ΔLa, vehicle speed V is controlled to increased target vehicle speed Vβ1 or Vβ2, depending on relative speed ΔV, at time t22 or time t23 (S8A→S9). When overtake activity is thereafter completed at time t25 or time t24, vehicle speed V decreases to predetermined vehicle speed (e.g., vehicle speed for following the forward vehicle), whereafter the predetermined vehicle speed is maintained.

Thus in the present embodiment, vehicle speed V (maximum vehicle speed) increases during vehicle overtaking in proportion as degree of proximity of the rearward vehicle to the subject vehicle after lane change is greater (as relative speed ΔV is faster). Therefore, time periods Δt20 (t20 to t26), Δt21 (t20 to t25) and Δt22 (t20 to t24) required to complete overtake activity are shorter in proportion as degree of proximity is greater (Δt20>Δt21>Δt22).

The present embodiment can achieve advantages and effects such as the following:

(1) The travel control apparatus 100B of the self-driving vehicle 101 according to the present embodiment, which is configured to control the actuators AC for driving the subject vehicle 101 having autonomous driving capability, includes: the proximity degree calculation unit 52 for calculating degree of proximity of the rearward vehicle to the subject vehicle; the proximity degree determination unit 53 for determining whether degree of proximity calculated by the proximity degree calculation unit 52 is equal to or greater than a predetermined value, namely, whether closest approach distance ΔLb is equal to or less than shortest inter-vehicle distance ΔLa; and the actuator control unit 57 for controlling actuators AC (throttle actuator 13 and shift actuator 23) to increase subject vehicle maximum vehicle speed (target vehicle speed V) more when ΔLb≤ΔLa is determined than when ΔLb>ΔLa is determined by the proximity degree determination unit 53 (FIG. 9).

Owing to this configuration, when a rearward vehicle approaches the subject vehicle from behind after the subject vehicle changed to passing lane LN2, for example, and no space is available for return of the subject vehicle to original lane LN1, the travel control apparatus 100B increases maximum vehicle speed V in accordance with inter-vehicle distance ΔL between the subject vehicle and the rearward vehicle (closest approach distance ΔLb). The subject vehicle can therefore perform vehicle overtaking in optimum manner with consideration to surrounding circumstances. In other words, notwithstanding that running of a rearward vehicle might be obstructed owing to shortening of inter-vehicle distance ΔL should a forward vehicle of it continue overtake activity without increasing its vehicle speed V, the travel control apparatus 100B avoids this risk by increasing vehicle speed V so as to maintain inter-vehicle distance ΔL of or greater than shortest inter-vehicle distance ΔLa, thereby ensuring optimum vehicle overtaking without interfering with running of a following vehicle.

(2) The travel control apparatus 100B further includes the relative value calculation unit 51 for calculating relative speed ΔV of rearward vehicle relative to the subject vehicle (FIG. 9). The actuator control unit 57 controls the throttle actuator 13, etc. so as to increase subject vehicle maximum speed in proportion as relative speed ΔV calculated by the relative value calculation unit 51 is faster. Therefore, vehicle speed V can be optimally controlled in accordance with degree of proximity of the rearward vehicle. As acceleration up to target vehicle speed is controlled to a constant value G at this time, passenger ride comfort is good.

(3) The travel control apparatus 100B further includes the exterior recognition unit 44 for recognizing surrounding circumstances of the subject vehicle and the lane change instruction unit 55 responsive to surrounding circumstances of the subject vehicle recognized by the exterior recognition unit 44 for instructing lane change from slow lane LN1 to passing lane LN2 in order to overtake the forward vehicle or lane change from passing lane LN2 to slow lane LN1 after overtaking the forward vehicle (FIGS. 2 and 9). The actuator control unit 57 (steering control unit 573) controls the steering actuator 58 so that the subject vehicle changes lanes in accordance with instruction from the lane change instruction unit 55. Although such lane changing is susceptible to the possibility of another vehicle (rearward vehicle) rapidly approaching the subject vehicle after lane change, the present embodiment can perform optimum lane changing in the course of overtake activity because it is configured to change subject vehicle maximum speed in accordance with degree of proximity of the rearward vehicle.

(4) The travel control apparatus 100B further includes the lane change determination unit 56 for determining whether lane change from passing lane LN2 to slow lane LN1 is possible after the subject vehicle changed lanes from slow lane LN1 to passing lane LN2 (FIG. 9). When the proximity degree determination unit 53 determines that degree of proximity of the rearward vehicle is equal to or greater than predetermined degree (ΔLb≤ΔLa) and the lane change determination unit 56 determines that lane change from passing lane LN2 to slow lane LN1 is possible, the lane change instruction unit 55 further instructs that lane change from passing lane LN2 to slow lane LN1 be performed before (without) overtaking the forward vehicle. Since this enables the subject vehicle to discontinue overtaking activity when another vehicle approaches from behind and makes return to original lane possible, instances of the subject vehicle running at higher than target velocity set by the initial action plan are less frequent.

Various modifications of the aforesaid embodiments are possible. Some examples are explained in the following. Although in the aforesaid embodiments, either vehicle acceleration G or maximum vehicle speed V is increased in response to increasing proximity of a rearward vehicle, response by increasing both vehicle acceleration G and maximum vehicle speed V is also possible. In this case, acceleration is preferably increased when inter-vehicle distance ΔL fails to fall to or below shortest inter-vehicle distance ΔLa despite increase of maximum vehicle speed V to maximum vehicle speed VP. This measure expeditiously mitigates adverse effect on passenger ride comfort.

Although in the aforesaid embodiments, the proximity degree calculation unit 52 is adapted to calculate degree of proximity to the subject vehicle of the rearward vehicle following the subject vehicle when the subject vehicle changes lanes from slow lane LN1 (first lane) to passing lane LN2 (second lane) or from passing lane LN2 to slow lane LN1, a first lane and second lane can be lanes other than a slow lane and passing lane. For example, the first lane or second lane can instead be a merging lane of an expressway, toll road or the like. Moreover, the proximity degree calculation unit 52 can be optionally adapted to calculate degree of proximity independently of lane changing. For example, a configuration can be adapted that controls vehicle acceleration or speed in accordance with degree of proximity of a rearward vehicle when the subject vehicle is running on a road with one lane in each direction. This capability can be achieved even if the lane change instruction unit 55 and lane change determination unit 56 are omitted.

In the aforesaid embodiments, the proximity degree determination unit 53 determines whether inter-vehicle distance ΔLb is equal to or less than shortest inter-vehicle distance ΔLa. However, the proximity degree determination unit can be of any configuration insofar as it determines whether degree of proximity of a following vehicle (rearward vehicle) calculated by the proximity degree calculation unit is equal to or greater than predetermined degree. An actuator control unit is not limited to the aforesaid configuration insofar as it controls actuators to increase vehicle acceleration or increase maximum vehicle speed of the subject vehicle when it is determined that degree of proximity is equal to or greater than a predetermined degree than when it is determined that degree of proximity is less than the predetermined degree.

Although in the aforesaid embodiments, the throttle actuator 13, shift actuator 23 and steering actuator 58 are controlled by the actuator control unit 57 during vehicle overtaking as actuators used for traveling activity of the self-driving vehicle, other actuators can also be included among the controlled actuators. Although in the aforesaid embodiments, the engine 1 is used as a drive power source, the present invention can be similarly applied to a vehicle using a drive power source other than an engine. In the aforesaid embodiments, the self-driving vehicle is configured to be switchable between manual drive mode and self-drive mode. However, a self-driving vehicle can instead be configured to travel solely in self-drive mode.

The present invention can also be used as a travel control method of a self-driving vehicle, configured to control an actuator used for driving the self-driving vehicle having a self-driving capability.

The above embodiment can be combined as desired with one or more of the above modifications. The modifications can also be combined with one another.

According to the present invention, it is possible to travel a self-driving vehicle in an optimum manner in accordance with a degree of proximity of a rearward vehicle to the self-driving vehicle.

Above, while the present invention has been described with reference to the preferred embodiments thereof, it will be understood, by those skilled in the art, that various changes and modifications may be made thereto without departing from the scope of the appended claims.

What is claimed is:

1. A travel control apparatus of a self-driving vehicle, configured to control an actuator used for driving the self-driving vehicle having a self-driving capability,
the travel control apparatus comprising an electric control unit having a microprocessor and a memory, wherein
the microprocessor is configured to perform:
calculating a relative vehicle speed of a rearward vehicle traveling in a second lane adjacent to a first lane at a rear of the self-driving vehicle relative to a vehicle speed of the self-driving vehicle traveling in the second lane so as to overtake a forward vehicle traveling in the first lane at a front of the self-driving vehicle;
calculating a time period required to overtake the forward vehicle traveling in the first lane and move from the second lane to the first lane after overtaking the forward vehicle for the self-driving vehicle traveling in the second lane;
calculating a distance closest to the self-driving vehicle of the rearward vehicle within the time period based on the relative vehicle speed;
determining whether the distance is equal to or shorter than a predetermined value; and
controlling the actuator so as to increase the vehicle speed of the self-driving vehicle to a first target speed at a predetermined target acceleration when it is determined that the distance is longer than the predetermined value, while to increase the vehicle speed to a second target speed faster than the first target speed at the predetermined target acceleration when it is determined that the distance is equal to or shorter than the predetermined value.

2. The apparatus according to claim 1, wherein
the microprocessor is configured to perform
the controlling including controlling the actuator so as to increase the vehicle speed of the self-driving vehicle along with an increase of the relative vehicle speed.

3. The apparatus according to claim 1, wherein
the microprocessor is configured to further perform:
recognizing an external circumstance of the self-driving vehicle; and
instructing a lane change from the first lane to the second lane so as to overtake the forward vehicle or from the second lane to the first lane after overtaking the forward vehicle, based on the external circumstance, and wherein
the microprocessor is configured to perform
the controlling including controlling the actuator so that the self-driving vehicle makes the lane change in accordance with an instruction in the instructing.

4. A travel control method of a self-driving vehicle, configured to control an actuator used for driving the self-driving vehicle having a self-driving capability, the travel control method comprising:
calculating a relative vehicle speed of a rearward vehicle traveling in a second lane adjacent to a first lane at a rear of the self-driving vehicle relative to a vehicle speed of the self-driving vehicle traveling in the second lane so as to overtake a forward vehicle traveling in the first lane at a front of the self-driving vehicle;
calculating a time period required to overtake the forward vehicle traveling in the first lane and move from the second lane to the first lane after overtaking the forward vehicle for the self-driving vehicle traveling in the second lane;
calculating a distance closest to the self-driving vehicle of the rearward vehicle within the time period, based on the relative vehicle speed;
determining whether the distance is equal to or shorter than a predetermined value; and
controlling the actuator so as to increase the vehicle speed of the self-driving vehicle to a first target speed at a predetermined target acceleration when it is determined that the distance is longer than the predetermined value, while to increase the vehicle speed to a second target speed faster than the first target speed at the predetermined target acceleration when it is determined that the distance is equal to or shorter than the predetermined value.

* * * * *